2 Sheets—Sheet 1.

S. R. RUCKEL.
Churn.

No. 213,452. Patented Mar. 18, 1879.

Attest:
H. D. Penne
Am Long

Samuel R. Ruckel.
Inventor.

By H. J. Abbot
Atty.

2 Sheets—Sheet 2.

S. R. RUCKEL.
Churn.

No. 213,452.    Patented Mar. 18, 1879.

Attest.
A. M. Long.
Wm. P. Henderson

Samuel R. Ruckel,
Inventor,
By H. S. Abbot
Atty.

N. PETERS, PHOTO-LITHOGRAPHER, WASHINGTON, D. C.

UNITED STATES PATENT OFFICE.

SAMUEL R. RUCKEL, OF KANSAS CITY, MISSOURI, ASSIGNOR OF ONE-HALF HIS RIGHT TO LAFAYETTE P. SWAYNE, OF SAME PLACE.

IMPROVEMENT IN CHURNS.

Specification forming part of Letters Patent No. 213,452, dated March 18, 1879; application filed December 6, 1878.

*To all whom it may concern:*

Be it known that I, SAMUEL R. RUCKEL, of Kansas City, in the county of Jackson and State of Missouri, have invented certain new and useful Improvements in Churns; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
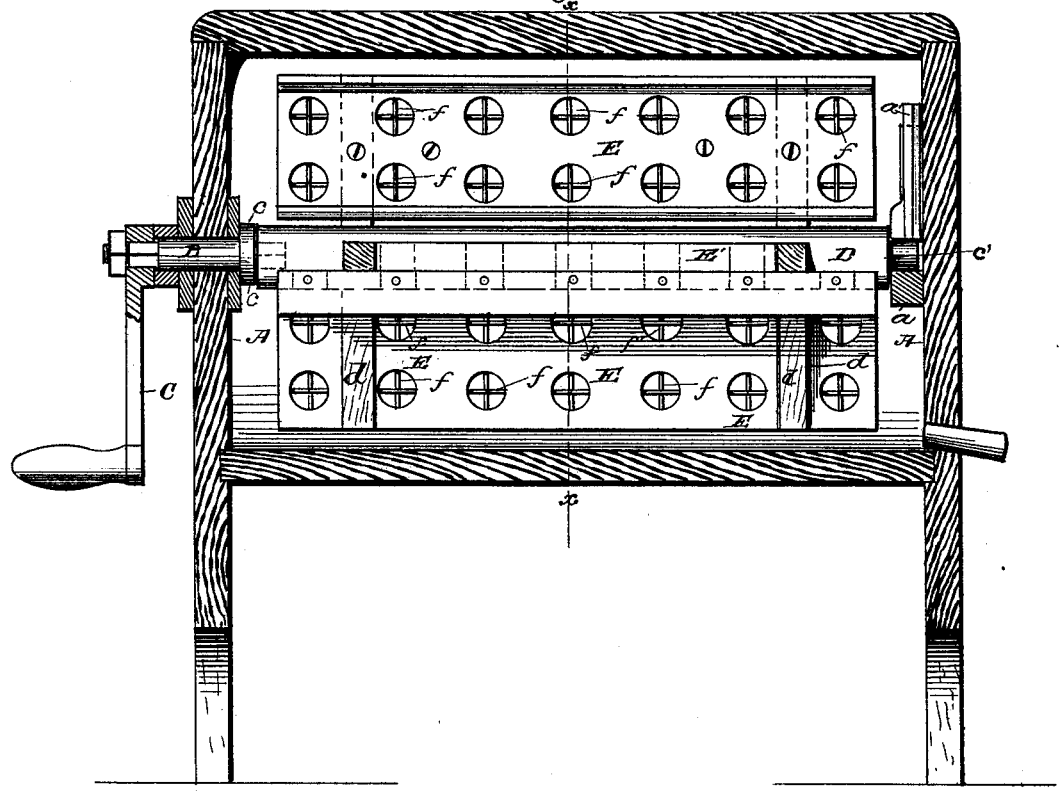
Figure 2:
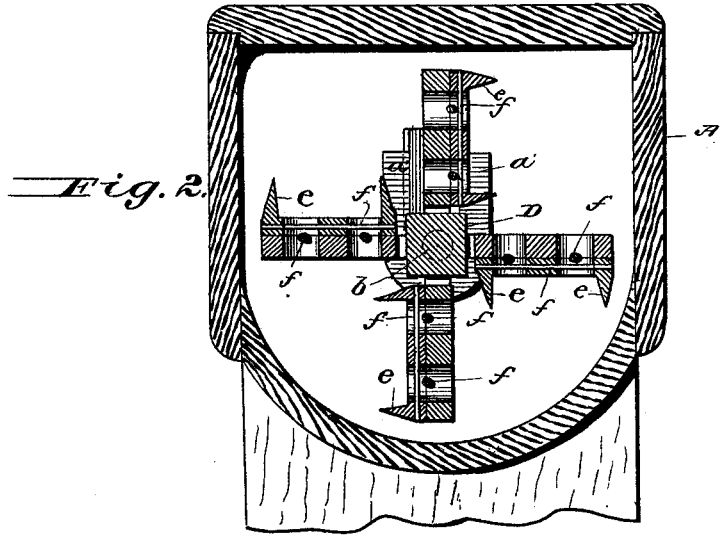
Figure 3:
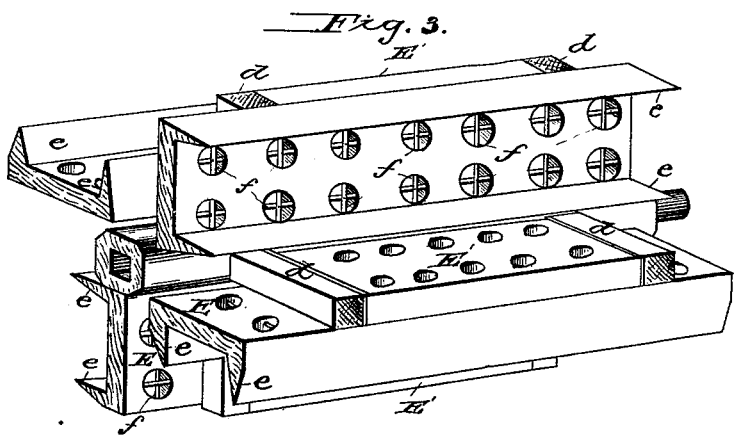

Figure 1 is a side view of the churn, with one side of the cylinder removed; Fig. 2, a cross-section of the dasher; Fig. 3, a perspective of the same.

My invention has particular reference to the construction of churn-dasher; and it consists of a dasher the wing or plunger of which is provided with cutting-blades, and which has openings or apertures through the same, in which are wires for the purpose of cutting the cream as it passes through these openings.

In the accompanying drawing, the letter A indicates the cylinder of the churn, which is provided on the inside of one end with a box, $a$, having a sliding plate, $a'$, while through the opposite end there extends a shaft, B, to the outer end of which is attached the crank C for turning the same. A collar, $c$, on the shaft B, a little way back from the end thereof, prevents the shaft from being pulled out of place. The dasher which operates within the cylinder A is composed of a shaft, D, provided with arms $d$, one end of the shaft having a journal, $c'$, which fits into the box $a$, and the other end being recessed, so that the end of shaft B may fit therein, whereby the shaft is journaled and rendered easy of removal.

The wings of the dasher are composed of strips E, each of which has an offset or backing, E$'$, which may be of the same piece constituting the strip or a separate piece fastened thereto, the object of these pieces being to lengthen the holes made in the wings for the purpose of cutting the cream which must pass through these holes. These wings are provided with blades $e$, which project at an angle from the face of the wings, and are designed to cut the cream when the dasher is operated, the cutting being further promoted by wires $ff$, which are run through and across the openings made in the wings. The wings thus formed are screwed or otherwise fastened to the arms $d$ of shaft D, the offset or backing E$'$ fitting between the arms, while the other portion of the wing fits across the face of and extends beyond the arms.

In operation, the cream, by the plunge of the dasher, is forced through the openings therein, by which means it is cut, and still further cut before passing through by the wires within the same, while before entering the openings it is cut by the blades on the wings or plungers.

Having thus described my invention, what I claim is—

1. The churn consisting of the cylinder A, having journaled therein a dasher the wings of which are provided with cutting-blades $e$, and openings having wires $f$ passing through them, substantially as set forth.

2. A churn-dasher consisting of the shaft and arms D $d$ and the wings E, having backing E$'$, provided with wire openings and with cutting-blades $e$, substantially as set forth.

3. A churn-dasher the wing of which is provided with wire openings and cutting-blades $e$, substantially as set forth.

In testimony that I claim the foregoing as my own I affix my signature in presence of two witnesses.

SAMUEL R. RUCKEL.

Witnesses:
D. F. GREENWOOD,
T. A. RUCKER.